United States Patent [19]

Nickolas et al.

[11] Patent Number: 5,802,334
[45] Date of Patent: Sep. 1, 1998

[54] METHOD FOR DISPLAYING OBJECT ORIENTED CLASS INFORMATION AND CONTENT INFORMATION

[75] Inventors: Stewart Earle Nickolas; Bruce Alan Tate, both of Austin, Tex.

[73] Assignee: International Business Machines Corporation, Armonk, N.Y.

[21] Appl. No.: 583,348

[22] Filed: Jan. 5, 1996

[51] Int. Cl.$^6$ ..................................................... G06F 3/14
[52] U.S. Cl. ........................................... 395/357; 395/334
[58] Field of Search ..................................... 395/334, 339, 395/333, 357

[56] References Cited

U.S. PATENT DOCUMENTS

| | | | |
|---|---|---|---|
| 5,168,441 | 12/1992 | Onaheim et al. | 364/146 |
| 5,283,898 | 2/1994 | Kusumoto et al. | 395/614 |
| 5,432,903 | 7/1995 | Frid-Nielsen | 395/349 |
| 5,537,630 | 7/1996 | Berry et al. | 395/335 |
| 5,544,354 | 8/1996 | May et al. | 395/604 |
| 5,590,330 | 12/1996 | Coskun et al. | 395/340 |
| 5,615,346 | 3/1997 | Gerken | 395/341 |
| 5,630,131 | 5/1997 | Palevich et al. | 395/701 |
| 5,642,511 | 6/1997 | How et al. | 395/701 |

OTHER PUBLICATIONS

"IBM Smalltalk User's Guide" Version 4.0, 1994.
Wasserman, A., "Requirements for OO Design Environments," IEEE Software Engineering Environments, pp. 207–211, 1995.

Jeff, J., "C+ +: the Whole Enchilada," InformationWeek, Mar. 25, 1996 n572 p1A(4) 1996.

Scott, M., "IBM packs OOP into VisualAge," InfoWorld Oct. 18, 1993, v15, n42, p3(1).

An Introduction to Object–Oriented Programming, T. Budd; c.1991, Addison–Wesley Publishing Co., pp. 45–47.

Primary Examiner—Raymond J. Bayerl
Assistant Examiner—A. Katbab
Attorney, Agent, or Firm—Sawyer & Associates; Mark S. Walker

[57] ABSTRACT

A method for displaying object oriented class information and content information, wherein a user interacts with an object oriented system on a computer display. The method combines a class browser and a content browser into a hybrid browser, where the class browser displays class information and the content browser displays content information. The class information and the content information are organized into a single outline control. The user is then allowed to switch between a display of the class information only, or a display of both the class information and the content information, wherein the single outline control reduces the amount of display space used.

14 Claims, 6 Drawing Sheets

METHOD FOR DISPLAYING OBJECT ORIENTED CLASS INFORMATION AND CONTENT INFORMATION

FIELD OF THE INVENTION

The present invention relates to object oriented class and content browsers, and more particularly to a method for displaying object oriented class information and content information using a hybrid browser.

BACKGROUND OF THE INVENTION

Object technology is a term that is used to describe a new movement in software development and design. Instead of keeping data in data structures and variables which are separate from functions, objects keep both data and functions in a single package. This package is called a class. There are many different elements of a class, including methods (like procedures or functions), and properties (like variables), and events.

Object oriented programming also supports a concept known as inheritance. This concept allows an object oriented class to be specialized. For example, a person class could be specialized through inheritance to create an employee class. The person class is called a superclass of the employee class. Similarly, the employee class is a subclass of person.

At least two types of class information are important to the object oriented programmer; inheritance relationships of a class and content of a class. Information regarding the content of a class is viewed, and sometimes modified, through a user interface known as a content browser. A content browser provides information about a single class, such as the methods, properties, events, and superclasses of any given object. Information regarding the inheritance relationships of a class is viewed through a user interface known as a class browser. Both class and content browsers usually provide class and content information in the form of an outline, or a graphically displayed tree.

Most object oriented systems (OO) provide class browsers and content browsers. Examples of such OO systems include VisualAge™ developed by the assignee of the present application. Some OO systems even combine class browsers with content browsers. Whether or not the class browser is combined with the content browser, most OO systems provide separate controls for the class browser and the content browser, such as graphical list boxes and text windows, for example. One control or window contains class inheritance information, while a separate control or window contains properties, methods, and events.

In addition to class/content browsers, most OO systems also include a code editor, which is also displayed in its own separate window. Unlike the Unix environment, the Windows, Macintosh, and OS/2 graphical-interface environments usually have a relatively small display, and with today's computing preferences, the amount of screen space is often limited. Furthermore, the proliferation of lap top computers has introduced even smaller displays into the programming arena. Given this hardware environment, conventional OO systems either display a small amount of information in a small area of the screen, or display a large amount of information in a large area of the screen.

Object oriented systems that display a small amount of information in a small area of the screen leave a maximum amount of screen space for other object oriented tools and editors. This is important to programmers who need access to view code windows, and interface editors. With this approach, however, both class content and class inheritance relationships may not be displayed together in the same small area of the screen. In this case, the programmer is usually forced to choose between viewing inheritance structure, which is important for good object oriented design, and viewing class content, which is important for implementation details. Both are very important to OO programmers.

Object oriented systems that display a large amount of information in a large area of the screen provide the object oriented programmer with all of the required information. Many of the browsers of this type, however, are incapable of fitting on the screen beside a functional code editor. This is disadvantageous since browsers and the code editor are two of the most important interfaces used in writing object oriented applications.

Object oriented systems that are capable of displaying class inheritance, class content, and a code editor on the screen at the same time dramatically reduce the available screen space for other important object oriented tools. This causes object oriented programmers to compromise. The programmers are forced to frequently change between different types of browsers and tools, which can significantly impact programming productivity.

Accordingly, what is needed is a graphical user interface for object oriented systems that is capable of displaying all relevant information to be displayed in a small area of the display screen. The present invention addresses such a need.

SUMMARY OF THE INVENTION

The present invention is a method for displaying object oriented class information and content information, wherein a user interacts with an object oriented system on a computer display. The method combines a class browser and a content browser into a hybrid browser, where the class browser displays class inheritance and the content browser displays content information. The class information and the content information are organized into a single outline control. The user is then allowed to switch between a display of the class information only, or a display of both the class information and the content information, thereby reducing the amount of display space used.

According to the method disclosed herein, a user can always display the appropriate class inheritance relationships along with class content in one window, without demanding screen space that could otherwise be used to edit code, debug applications, or do other tasks, thereby increasing programming productivity.

DESCRIPTION OF THE INVENTION

The present invention relates to an improvement in object oriented class and content browsers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
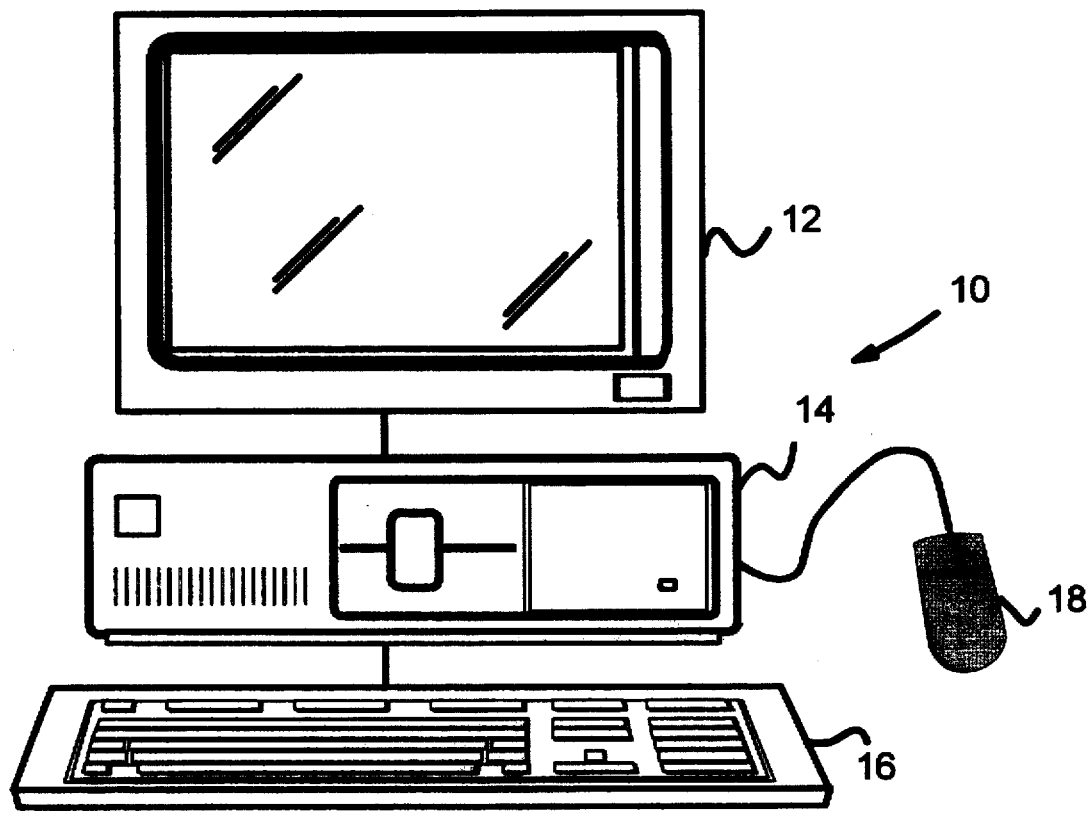
FIG. 1 is a block diagram of a generic computer system that is capable of displaying objected oriented systems and applications in accordance with the present invention.

FIG. 1 is a block diagram of a generic computer system 10 that is capable of displaying objected oriented systems and applications in accordance with the present invention. The computer system 10 includes a display device 12, a processor 14, keyboard 16, and a mouse 18. An object oriented system or application is processed by the processor 14, and object oriented controls or windows for browsers and code editors are displayed on the display device 12. A user may select what is displayed on the display device 12 or input data using the keyboard 16 and the mouse 18.

Figure 2:
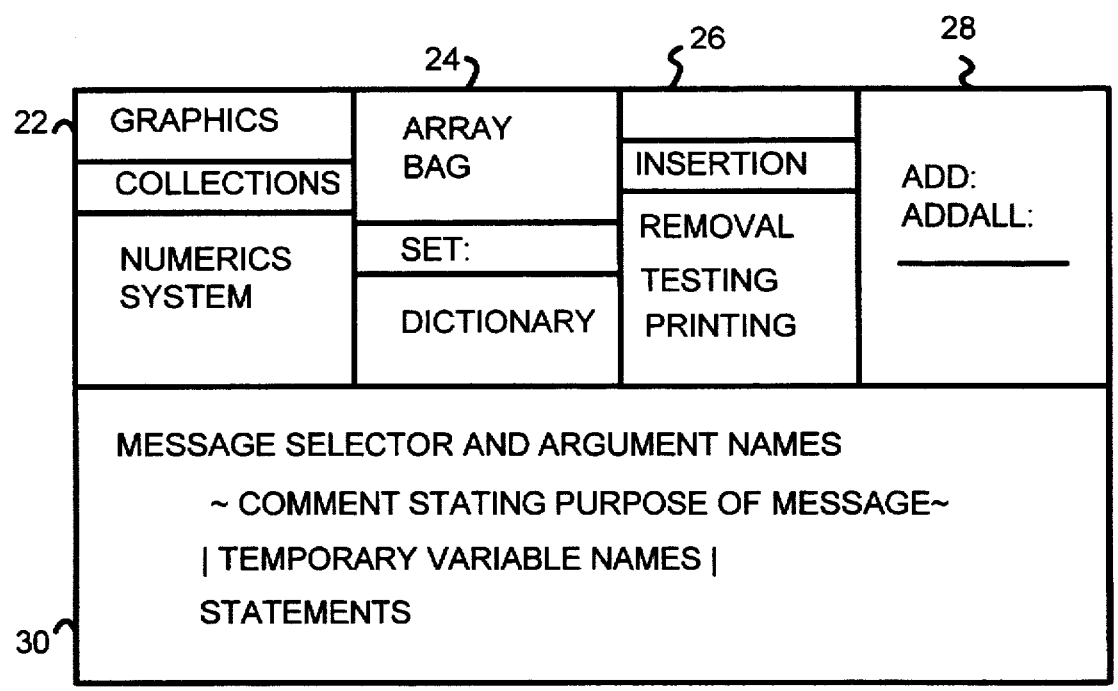
FIG. 2 is a block diagram illustrating a view of a conventional browser interface.

FIG. 2 is a block diagram illustrating a view of a conventional browser interface. For purposes of this disclosure, the browser 20 is part of the Smalltalk object oriented language and is used as an example. The Smalltalk browser 20 includes five separate windows; four small upper windows 22, 24, 26, and 28 one large lower window 30. Each of the upper windows 22–28 scrolls over lists of textual material. The bottom window 30 is used to display and edit information. The browser 30 is manipulated by the mouse 18, which typically includes three separate buttons.

Classes in Smalltalk are grouped together into categories. The first window 22 scrolls over all the class categories known to the system. Selecting one of the categories in the first window causes two actions. The first is to display, in the second window 24, the list of all classes currently organized under the selected category. The second action is to display, in the large editing window 30, the text of a message used to create new classes.

By pointing and clicking the mouse 18, a user can edit the message. Usually in any browser, when a user clicks on the right mouse button, a pop-up menu is displayed. These menus are different in class browsers and content browsers. Appropriate menu choices for a class browser might be "Add subclass", "Remove class", and "Change Parent". These are generally the things that modify inheritance relationships. Having performed the appropriate action regarding the class, the user selects an "accept" operation from a menu of possibilities.

The third and fourth windows 26 and 28 display content information. The third window 26 describes groups of permitted operations or events for the selected class. Selecting an event from the third window 26 causes the existing methods for the event to be displayed in the fourth window 28, while simultaneously a template that can be edited to generate new methods is displayed in the bottom window. To create a new method, the user edits the template, and selects the "accept" item from a menu when complete.

As shown in the example of FIG. 2, some conventional browsers, such as the Smalltalk browser 20, are capable of displaying class inheritance and content information at one time in separate controls (windows). However, displaying all these windows dramatically reduces the available screen space for other important object oriented tools, such as debuggers, instance browsers, and profiling tools, for example. This forces programmers to frequently switch between the browser 20 and other important object oriented tools, which can reduce programming productivity.

The present invention is an object oriented hybrid browser that is capable of displaying both class inheritance and class content information in outline form in a single control or window. To more particularly illustrate the object oriented hybrid browser in accordance with the present invention, refer now to FIG. 3.

Figure 3:
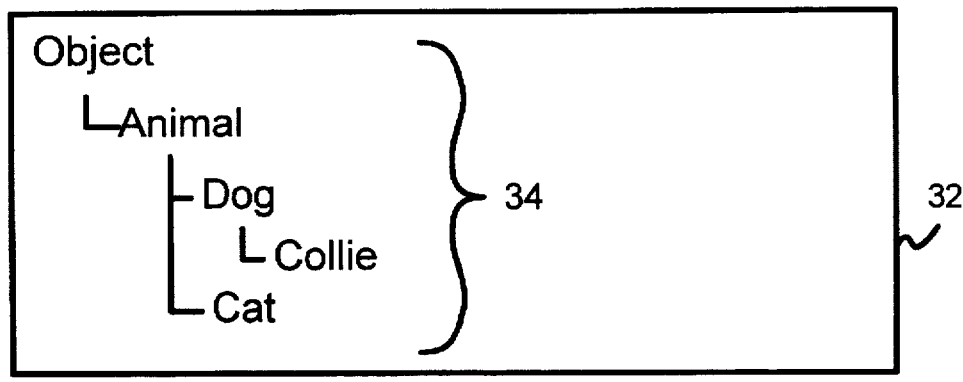
FIG. 3 is a diagram illustrating the hybrid browser of the present invention that displays class inheritance and content in a single outline control.

FIG. 3 is a diagram illustrating the hybrid browser 31 of the present invention that displays class inheritance and content in a single outline control 32. The hybrid browser 32 initially displays only class inheritance information 34 in the outline control 32. In the example shown, "Object" is the root node of all classes; "Animal" is a subclass or child or the parent node "Object"; "Dog" and "Cat" are children of node "Animal"; and "Collie" is a child of the node "Dog".

As with conventional class browsers, the outline control 32 is able to show or hide the children for any given node. In contrast to conventional browsers, however, the hybrid browser also displays class content in the outline control 32 when a particular class is selected, as shown in FIG. 4.

Figure 4:
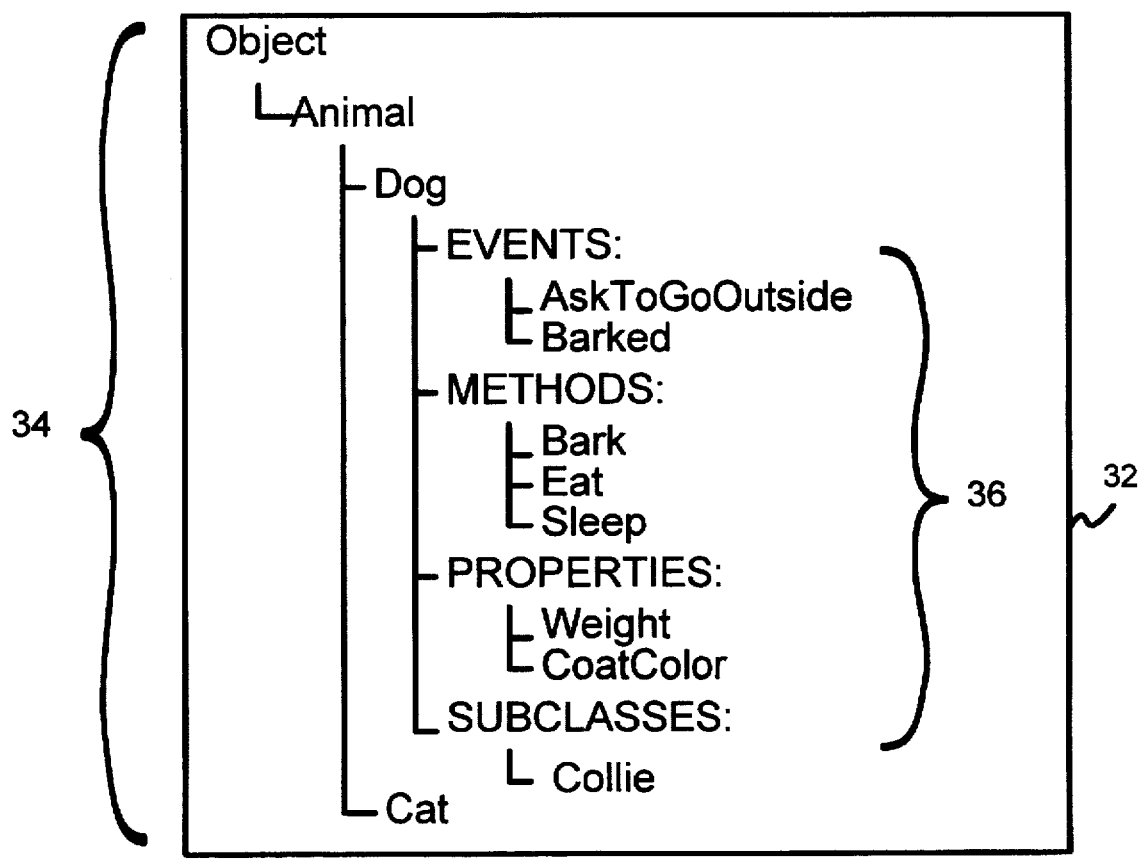
FIG. 4 is a diagram illustrating how the hybrid browser displays both class inheritance 34 and class content in the outline control.

FIG. 4 is a diagram illustrating how the hybrid browser 31 displays both class inheritance 34 and class content 36 in the outline control 32. In a preferred embodiment, a user can display class content 36 by double clicking on a particular class (other gestures will also suffice). After a user has selected a class, the following content information 36 is displayed under the selected class node: an "Events" node for listing events of the class, a "Methods" node for listing methods, a "Properties" node for listing properties, and a "Subclasses" node for listing the subclasses. Different words can be used to describe the same concepts, and the class content 36 can be modified to display additional class content information.

One key feature of the hybrid browser 31 is that after the user selects a class in the outline control 32, the children of the selected class are hidden. All parents of the selected node are inheritance information, while all children of the selected node are shown as one of the content of the selected class. In the example of FIG. 4, "Dog" is the selected class, and "Collie", which is a child of the node "Dog", has been organized and displayed under the "Subclasses" field of the class content 32.

In a preferred embodiment of the present invention, when a class is selected, the color of the selected class is changed to indicate selection. This way, the hybrid browser 31 enables the user to quickly distinguish between inheritance information 34 and content 36. All children are also displayed in the color of the selected class. Other methods to distinguish between inheritance information 34 and content 36 are also possible, such as changing the font of the class title, or using italics or bold.

In a further preferred embodiment, when a user selects a class node, the hybrid browser 31 also displays a pop-up menu that includes menu items for appropriate for a class browser or a content browser, depending on which node is selected. Appropriate menu choices for a class browser, for example, may be "Add subclass", "Remove class", and "Change Parent". These are generally actions that modify inheritance information 34. Appropriate menu choices for a content browser may be "Edit", "Add method", and the like. These menu choices change the content of a single class.

Methods, properties, classes, and events usually have associated editors. When a user selects on any of the content nodes 36 of a class, by double clicking for example, the hybrid browser 31 invokes an appropriate object oriented editor. For example, if the user double clicks on the "Method" node, the hybrid browser 31 invokes the editor that allows the user to write corresponding code for the method. For this reason, a method editor is commonly referred to as a code editor.

If the user double clicks on the selected class again ("Dog"), the hybrid browser 31 returns to inheritance mode to display the inheritance information 34 in the outline control 32, as shown in FIG. 3.

Figure 5:
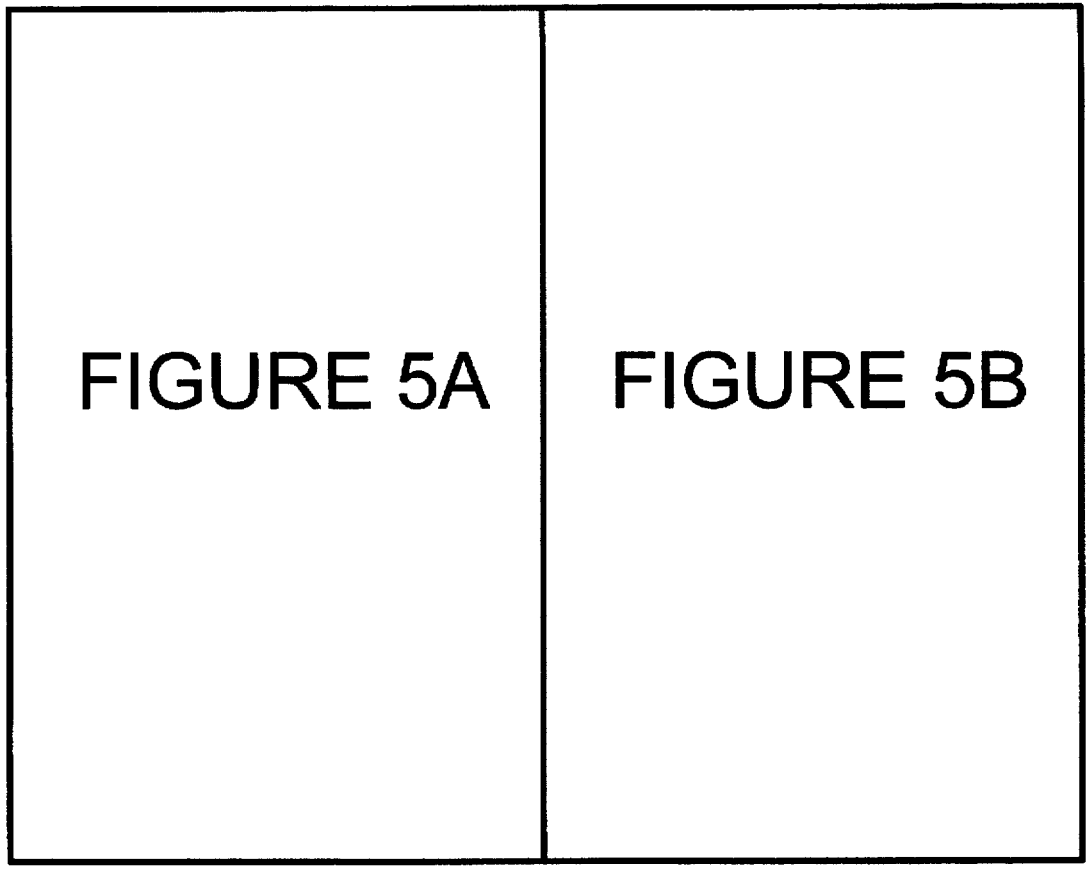
FIG. 5 is a flow chart depicting the steps taken by the hybrid browser in a preferred embodiment of the present invention.
Figure 5A:
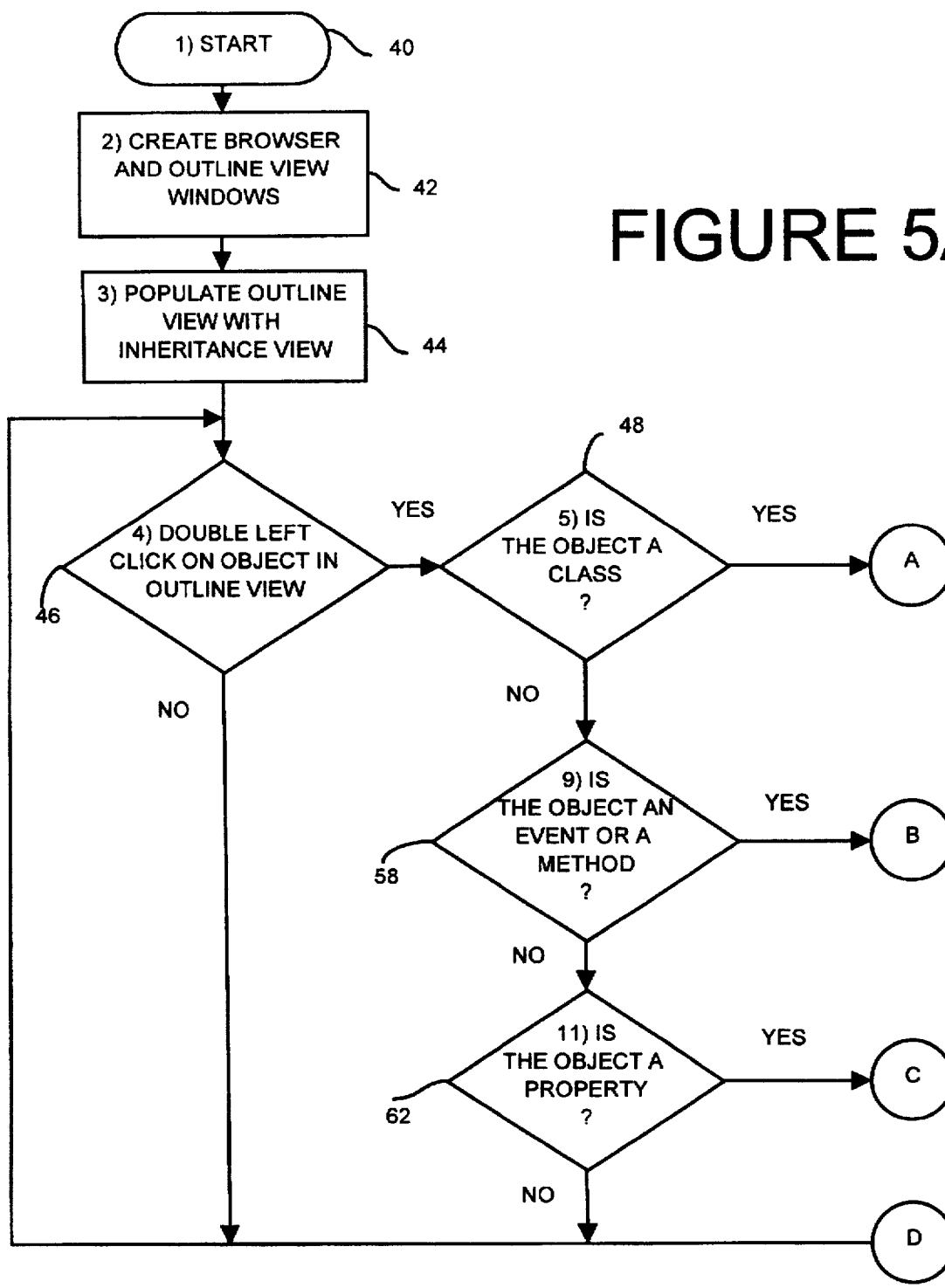
Figure 5B:
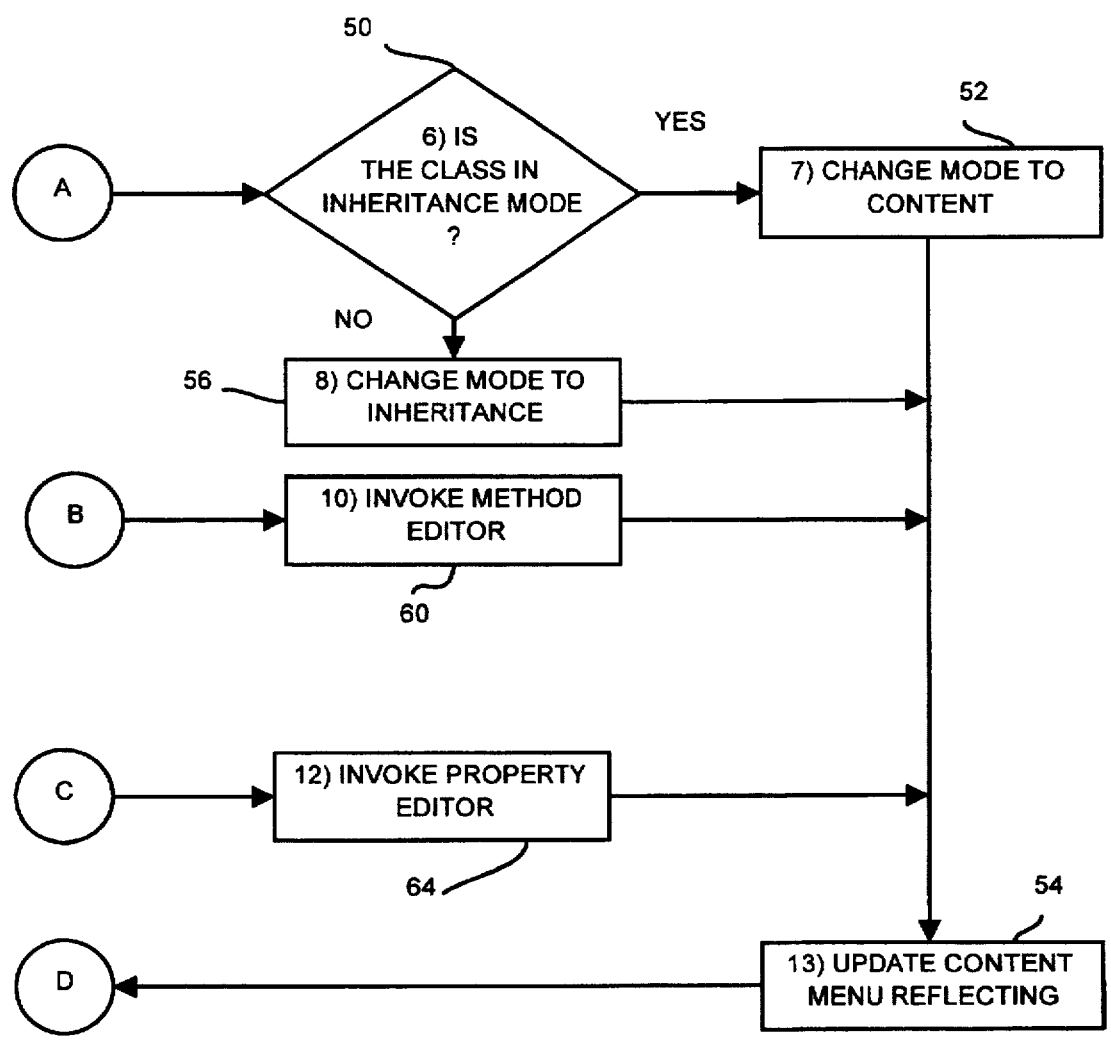

FIG. 5 is a flow chart depicting the steps taken by the hybrid browser 31 in a preferred embodiment Referring now to FIGS. 3–5, when the hybrid browser 31 is started in step 40, the outline control 32 is created and populated with inheritance information 34 in steps 42 and 44, respectively.

When a user double clicks on an node in the outline control 32 in step 46, it is determined whether the node is a class, an event or method, or a property. If the node is a class in step 48, then it is determined if the hybrid browser 31 is in inheritance mode in step 50. Inheritance mode means that only inheritance information 34 is displayed.

If the hybrid browser 31 is in inheritance mode, then the hybrid browser 31 changes to content mode to display content information 36 in step 52. The outline control 32 is then updated with the content information 36 corresponding to the selected class in step 54.

If the hybrid browser 31 is not in inheritance mode in step 50, then the hybrid browser 31 changes to inheritance mode in step 56, and outline control 32 is updated with inheritance information 34 accordingly in step 54.

If the node is an event or method in step 58, then the hybrid browser 31 invokes a method editor in step 60. If the node is a property in step 62, then the hybrid browser 31 invokes a property editor in step 64.

Using the hybrid browser 31, a programmer can always display the appropriate class inheritance information 34 along with class content 36 in one window, without demanding screen space that could otherwise be used to edit code, debug applications, or do other tasks. In a preferred embodiment, the outline control 32 is a window that is approximately 4×6 inches in size.

The advantages provided by the present invention are achieved by combining the functions of a class browser and a content browser into a single browser; organizing all of the information into a single outline control; and allowing the user to switch between the combined browser and a class browser with a single gesture.

In addition, appropriate visual cues are provided to aid a user in distinguishing between class inheritance and class content information, and a single gesture enables the user to quickly see more detail regarding a class and any of its content.

A method for displaying object oriented class information and content information using a hybrid browser has been disclosed. Software written according to the present invention is to be stored in some form of computer-readable medium, such as memory or CD-ROM, and executed by a processor.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for displaying object oriented class information and content information, wherein a user interacts with an object oriented system on a computer display, the method comprising the steps of:

(a) combining a class browser and a content browser into a hybrid browser, the class browser displaying class information and the content browser displaying content information;

(b) organizing the class information and the content information into a single outline control; and (c) allowing the user to switch between a display of the class information only, and a display of both the class information and the content information, wherein the single outline control reduces the amount of display space used.

2. A method as in claim 1 wherein step (b) further includes the step of:

(b1) providing at least one class node in the class information; and (b2) providing a plurality of content nodes in the content information for the class node, the content nodes including event nodes, method nodes, and property nodes.

3. A method as in claim 1 wherein the computer includes a mouse, and wherein step (c) further includes the step of:

(c1) switching between a display of the class information only, and a display of both the class information and the content information in response to a mouse and keyboard selection.

4. A method as in claim 3 wherein step (c) further includes the step of:

(c2) when the user selects a first class node, displaying the event nodes, method nodes, and property nodes corresponding to the first class node.

5. A method as in claim 4 wherein step (c) further includes the step of:

(c3) when the user selects the first class node, displaying the class information only.

6. A method as in claim 5 wherein step (c) further includes the step of:

(c4) providing visual cues to distinguish between the class information and the content information.

7. A computer-readable medium containing program instructions for displaying object oriented class information and content information, wherein a user interacts with an object oriented system on a computer display, the program instructions for:

(a) combining a class browser and a content browser into a hybrid browser, the class browser displaying class information and the content browser displaying content information;

(b) organizing the class information and the content information into a single outline control; and (c) allowing the user to switch between a display of the class information only, and a display of both the class information and the content information, wherein the single outline control reduces the amount of display space used.

8. A computer-readable medium as in claim 7 wherein instruction (b) further includes instructions for:

(b1) providing at least one class node in the class information; and (b2) providing a plurality of content nodes in the content information for the class node, the content nodes including event nodes, computer-readable medium nodes, and property nodes.

9. A computer-readable medium as in claim 7 wherein the computer includes a mouse, and wherein instruction (c) further includes instructions for:

(c1) switching between a display of the class information only, and a display of both the class information and the content information in response to a mouse and keyboard selection.

10. A computer-readable medium as in claim 9 wherein instruction (c) further includes instructions for:
   (c2) when the user selects a first class node, displaying the event nodes, computer-readable medium nodes, and property nodes corresponding to the first class node.

11. A computer-readable medium as in claim 10 wherein instruction (c) further includes instructions for:
   (c3) when the user selects the first class node, displaying the class information only.

12. A computer-readable medium as in claim 11 wherein instruction (c) further includes instructions for:
   (c4) providing visual cues to distinguish between the class information and the content information.

13. A method for displaying object oriented class information and content information, wherein a user interacts with an object oriented system on a computer display, the method comprising the steps of:
   (a) creating a single outline control;
   (b) populating the outline control with class information, the class information including a plurality of nodes;
   (c) when a user selects a first node from the outline control determining whether the first node is one of a class, an event, method, and a property;
   (d) if the first node is one of an event and method, then invoking a method editor;
   (e) if the first node is a property, then invoking a property editor; and
   (f) if the first node is a class, then;
      (f1) if only the class information is displayed in the outline control then updating the outline control with the content information corresponding to the first node, and
      (f2) if the content information corresponding to the first node is already displayed in the outline control then updating the outline control with the class information only, wherein the single outline control reduces the amount of display space used.

14. A computer-readable medium containing program instructions for displaying object oriented class information and content information, wherein a user interacts with an object oriented system on a computer display, the instructions for:
   (a) creating a single outline control;
   (b) populating the outline control with class information, the class information including a plurality of nodes;
   (c) when a user selects a first node from the outline control determining whether the first node is one of a class, an event, method, and a property;
   (d) if the first node is one of an event and method, then invoking a method editor;
   (e) if the first node is a property, then involving a property editor; and
   (f) if the first node is a class, then;
      (f1) if only the class information is displayed in the outline control then updating the outline control with the content information corresponding to the first node, and
      (f2) if the content information corresponding to the first node is already displayed in the outline control then updating the outline control with the class information only, wherein the single outline control reduces the amount of display space used.

* * * * *